US012258244B2

(12) United States Patent
Hatcher et al.

(10) Patent No.: US 12,258,244 B2
(45) Date of Patent: Mar. 25, 2025

(54) COME ALONG DEVICE

(71) Applicant: Winston Products LLC, Cleveland, OH (US)

(72) Inventors: Troy Hatcher, Bay Village, OH (US); Jesse Paradis, North Royalton, OH (US)

(73) Assignee: Winston Products LLC, Cleveland, OH (US)

( * ) Notice: Subject to any disclaimer, the term of this patent is extended or adjusted under 35 U.S.C. 154(b) by 0 days.

(21) Appl. No.: 18/510,927

(22) Filed: Nov. 16, 2023

(65) Prior Publication Data

US 2024/0083721 A1 Mar. 14, 2024

Related U.S. Application Data

(63) Continuation of application No. 17/554,750, filed on Dec. 17, 2021, now Pat. No. 11,851,307.

(60) Provisional application No. 63/127,529, filed on Dec. 18, 2020.

(51) Int. Cl.
*B66D 3/20* (2006.01)
*B66D 3/02* (2006.01)

(52) U.S. Cl.
CPC ........ *B66D 3/02* (2013.01); *B66D 2700/0116* (2013.01)

(58) Field of Classification Search
CPC ... B66D 3/02; B66D 3/14; B66D 1/04; B66D 1/48; B66D 1/50; B66D 2700/0116
See application file for complete search history.

(56) References Cited

U.S. PATENT DOCUMENTS 2,506,029 A 5/1950 Maasdam
2,669,426 A 2/1954 Anglemyer
3,003,359 A 10/1961 Felber
3,163,400 A 12/1964 Skerry
3,724,816 A * 4/1973 Cain ..................... F16H 31/002 254/369
3,727,886 A 4/1973 Cain
3,765,652 A * 10/1973 Janik ........................ B66D 3/14 254/376
3,868,091 A 2/1975 Hoffman
4,008,881 A 2/1977 Ross
4,045,001 A 8/1977 Harvey, Jr.
4,445,669 A 5/1984 Wilson
4,723,757 A 2/1988 Steinman et al.
8,424,846 B1 4/2013 Perduta
2003/0085392 A1 5/2003 Hsieh
2018/0339637 A1 11/2018 Hatcher

* cited by examiner

*Primary Examiner* — Emmanuel M Marcelo
(74) *Attorney, Agent, or Firm* — Tucker Ellis LLP

(57) ABSTRACT

Provided is an improved come along device with a handle, a release trigger for a stop pawl, and a push tab for a release pawl. The handle may allow an operator to better grasp the come along device. The release trigger allows an operator to release tension in a cable by disengaging the stop pawl when the trigger is pulled and engaging the stop pawl when the trigger is released. The push tab allows an operator to disengage the release pawl when the push tab is pressed and engage the release pawl when the push tab is pulled.

20 Claims, 11 Drawing Sheets

COME ALONG DEVICE

RELATED APPLICATIONS

This application is a continuation of U.S. application Ser. No. 17/554,750, filed Dec. 17, 2021, which claims the benefit of U.S. Provisional Application No. 63/127,529 filed Dec. 18, 2020, which are incorporated herein by reference in its entirety.

FIELD OF INVENTION

The present invention relates generally to a tension producing device, often referred to as a come along tool.

BACKGROUND

Cables are often utilized to move heavy objects from one location to another. This may be done by attaching a first end of a cable to a moveable object and the second end of the cable to a stationary object. To move the moveable object, tension may be applied to the cable to move the moveable object in the direction of the stationary object. Examples of tension producing devices are winches, ratchets, come along tools, and the like.

A come along tool utilizes a frame rotatably supporting a winch upon which a cable is wound. Come alongs typically include a frame-mounted ratchet mechanism that limits rotation of the winch to a single direction during cable winding. The cable is wound around the winch by a hand-operated handle until a desired tension is produced. Then, to release the tension in the cable, the ratchet mechanism is unlocked to allow the cable to be unwound.

SUMMARY OF INVENTION

The present application relates to methods for improving a come along device. Come along devices may be dangerous and hard to use because of the open-ratchet design and lack of suitable locations for an operator to grasp. Operators may be injured, for example, when fingers are caught in moving parts of the device.

In an exemplary embodiment, a come along device is provided with a handle for gripping the device and a trigger for releasing tension of a cable tensioned by the come along device. The trigger may be located proximate the handle to allow a user to grip the handle and simultaneously pull the trigger to release tension of a cable. The trigger may be affixed to a stop pawl that engages a sprocket of the come along. When the trigger is pulled, the stop pawl may be disengaged from the sprocket to allow rotation of the sprocket and a release of tension. The stop pawl may be biased in an engaged position to prevent rotation of the sprocket and prevent a release of tension in the cable.

The come along device may also include a push tab affixed to a release pawl of the come along device. The release pawl may be affixed to an elongated arm and may engage with the sprocket such that the cable is wound when the arm is rotated in a direction. When the push tab is pressed down, the release pawl may be disengaged with the sprocket to allow the arm to rotate freely. When the push tab is pulled up, the release pawl may engage with the sprocket allowing a user to rotate the sprocket by rotating the arm (i.e., to increase tension on a cable, etc.).

According to an aspect, a come along device comprises a body, an arm movable relative to the body, a sprocket rotatably attached to the body and configured to accept a cable, a stop pawl configured to rotate between an engaged position and a disengaged position, wherein the stop pawl engages the sprocket when the stop pawl is in the engaged position to prevent rotation of the sprocket in a first direction and to allow rotation of the sprocket in a second direction, a release pawl coupled to the arm and configured to rotate between an engaged position and a disengaged position, wherein the release pawl engages the sprocket when the release pawl is in the engaged position such that when the arm is rotated in the second direction the sprocket is also rotated in the second direction to apply a tension in the cable, a release trigger extending from the stop pawl to move the stop pawl between the engaged position and the disengaged position such that the sprocket may be rotated in the first direction when in the disengaged position to release the tension in the cable, and a push tab coupled to the release pawl to move the release pawl between the engaged position and the disengaged position and coupled to the arm via a biasing member.

According to an aspect, the come along device further comprises a handle for a user to grip extending from the body proximate the release trigger.

According to an aspect, the come along device further comprises a hook extending from an end of the handle opposite the body.

According to an aspect, the user's hand is configured to grip the handle and the user's finger configured to move the release trigger.

According to an aspect, the release pawl is held in either of the engaged position or the disengaged position by the biasing member.

According to an aspect, the push tab is configured to move the release pawl into the engaged position when pushed in a first direction.

According to an aspect, the push tab is configured to move the release pawl into the disengaged position when pulled in a second direction opposite the first direction.

According to an aspect, the come along device further comprises a release surface configured to bias the push tab in a direction when the arm is rotated fully in the first direction such that the release pawl is placed into the disengaged position.

According to an aspect, the stop pawl is biased in the engaged position by a biasing member.

According to an aspect, a come along device comprises a body, a sprocket rotatably attached to the body and configured to accept a cable, a stop pawl configured to rotate between an engaged position and a disengaged position, wherein the stop pawl engages the sprocket when the stop pawl is in the engaged position to prevent rotation of the sprocket in a first direction and to allow rotation of the sprocket in a second direction, a release pawl coupled to the body and configured to rotate between an engaged position and a disengaged position, wherein the release pawl engages the sprocket when the release pawl is in the engaged position, a release trigger extending from the stop pawl configured to move the stop pawl between the engaged position and the disengaged position such that the sprocket may rotated in the first direction when in the disengaged position to release a tension in the cable, and a handle for a user to grip extending from the body proximate the release trigger.

According to an aspect, the come along device further comprises a push tab configured to move the release pawl between the engaged position and the disengaged position.

According to an aspect, the come along device further comprises an arm moveably attached to the body, wherein the push tab is coupled to the release pawl to move the release pawl between the engaged position and the disengaged position and coupled to the arm via a biasing member.

According to an aspect, the push tab is configured to move the release pawl into the engaged position when pushed in a first direction.

According to an aspect, the push tab is configured to move the release pawl into the disengaged position when pulled in a second direction opposite the first direction.

According to an aspect, the come along device further comprises an arm rotatably attached to the body and a release surface configured to bias the push tab in a direction when the arm is rotated fully in the first direction such that the release pawl is placed into the disengaged position.

According to an aspect, the stop pawl is biased in the engaged position by a spring.

According to an aspect, the come along device further comprises a hook extending from an end of the handle opposite the body.

According to an aspect, the user's hand is configured to grip the handle and the user's finger configured to move the release trigger.

According to an aspect, a come along device comprises a body having a first end and a second end, an arm rotatable about an axis relative to the body, a sprocket rotatably attached to the body and configured to accept a cable, a stop pawl configured to rotate between an engaged position and a disengaged position, wherein the stop pawl engages the sprocket when the stop pawl is in the engaged position to prevent rotation of the sprocket in a first direction, a release pawl affixed to the arm and configured to rotate between an engaged position and a disengaged position, wherein the release pawl engages the sprocket when the release pawl is in the engaged position such that the sprocket is rotated in the second direction to apply a tension in the cable when the arm is rotated in the second direction, a release trigger affixed to the stop pawl configured to move the stop pawl between the engaged position and the disengaged position such that the sprocket may rotated in the first direction when in the disengaged position to release the tension in the cable, and a push tab configured to move the release pawl between the engaged position and the disengaged position.

According to an aspect, the come along device further comprises a release surface configured to bias the push tab in a direction when the arm is rotated fully in the first direction such that the release pawl is placed into the disengaged position.

The foregoing and other features of the invention are hereinafter described in greater detail with reference to the accompanying drawings.

DETAILED DESCRIPTION

Figure 1:
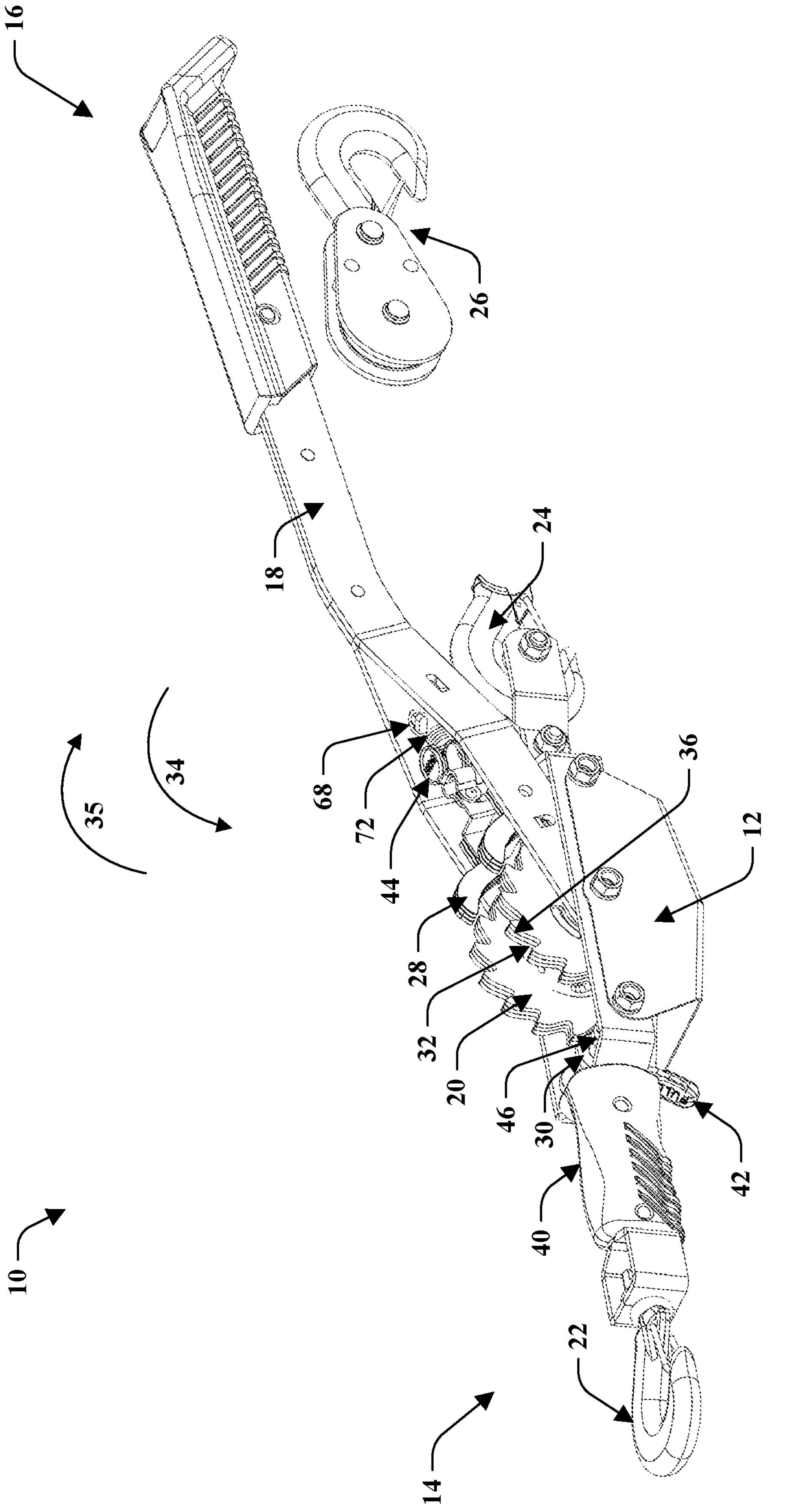
FIG. 1 is a perspective view of an exemplary come along device.
Figure 2:
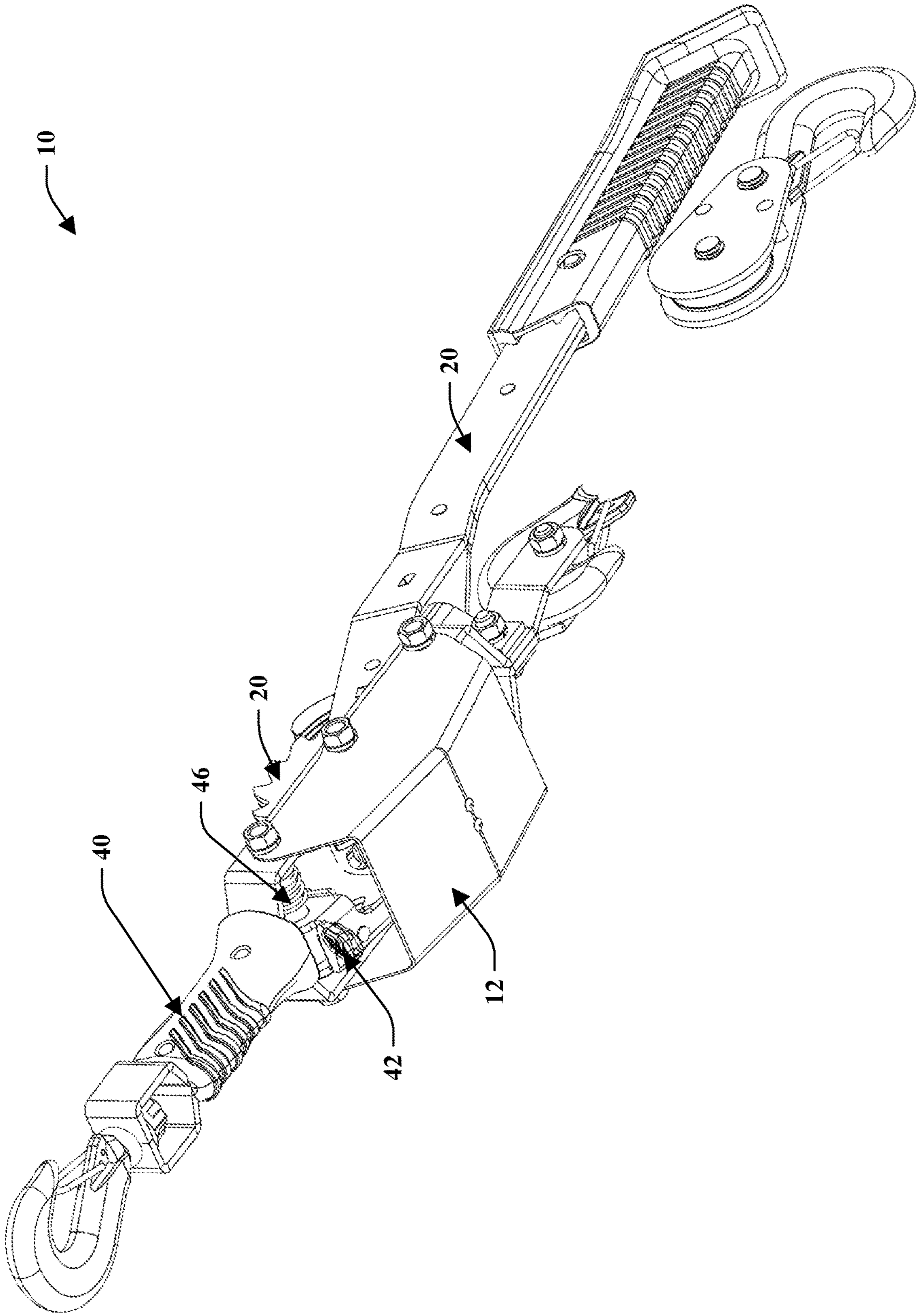
FIG. 2 is another perspective view of the come along device.
Figure 3:
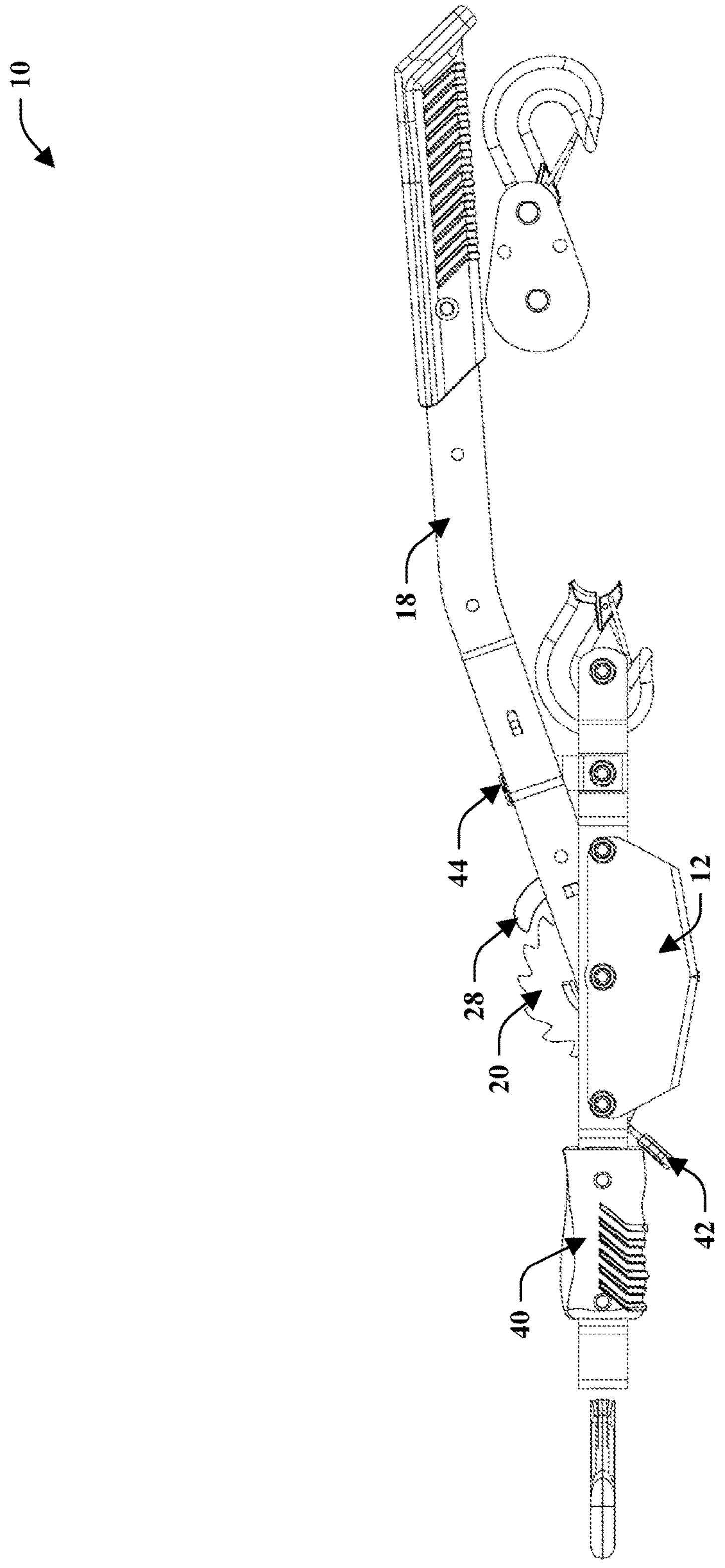
FIG. 3 is a front view of the come along device.
Figure 5:
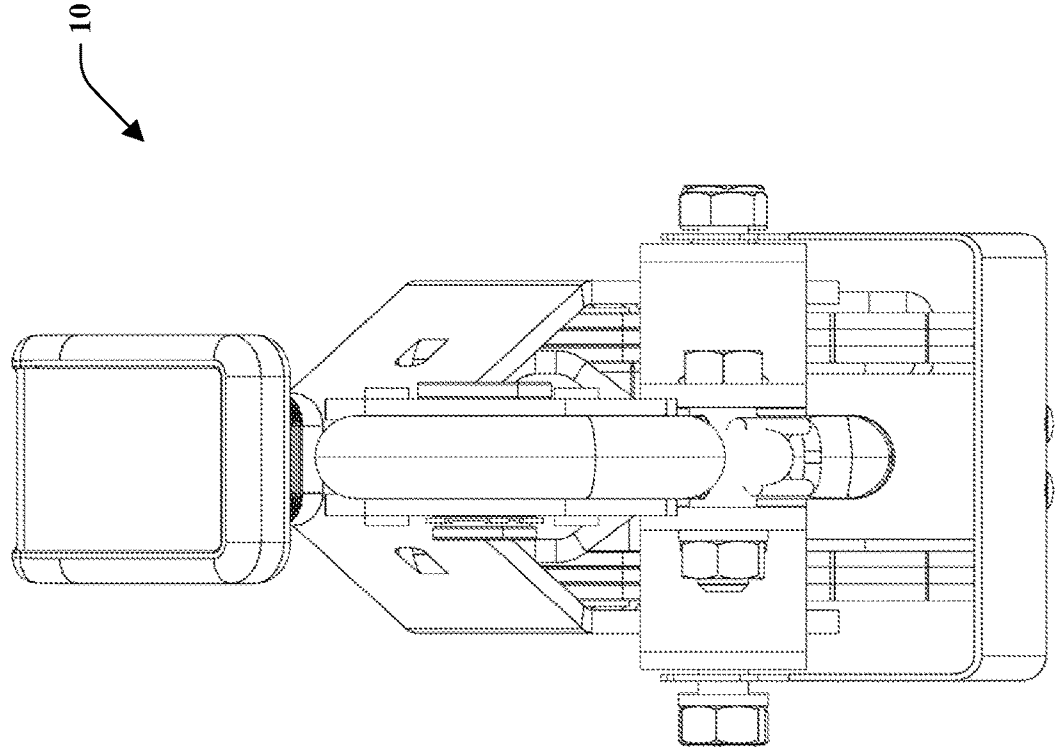
FIG. 5 is a right side view of the come along device.
Figure 4:
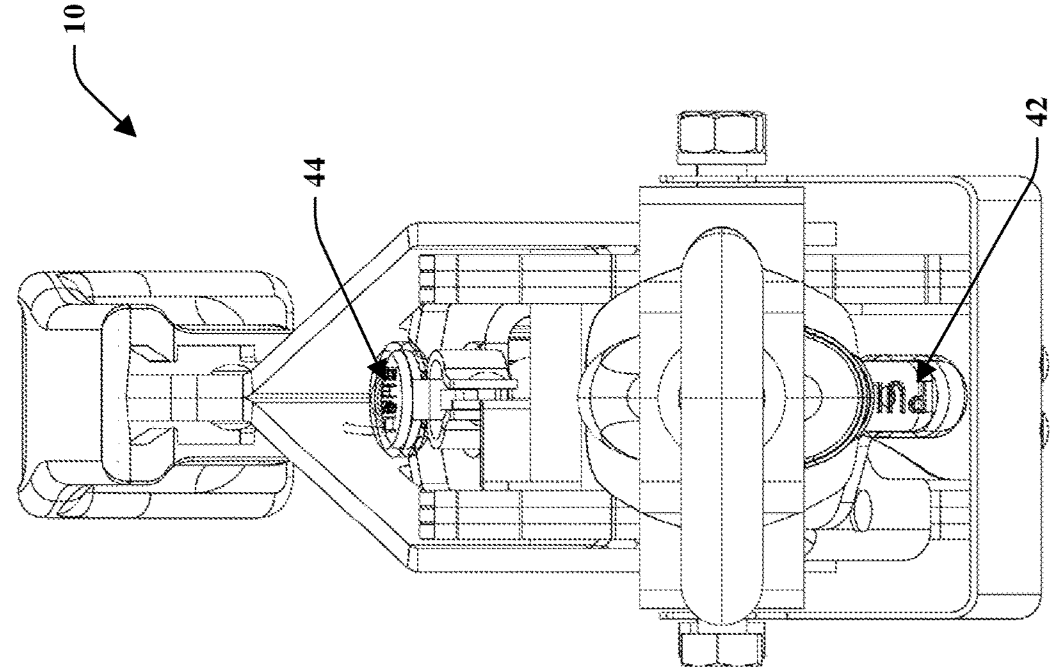
FIG. 4 is a left side view of the come along device.
Figure 6:
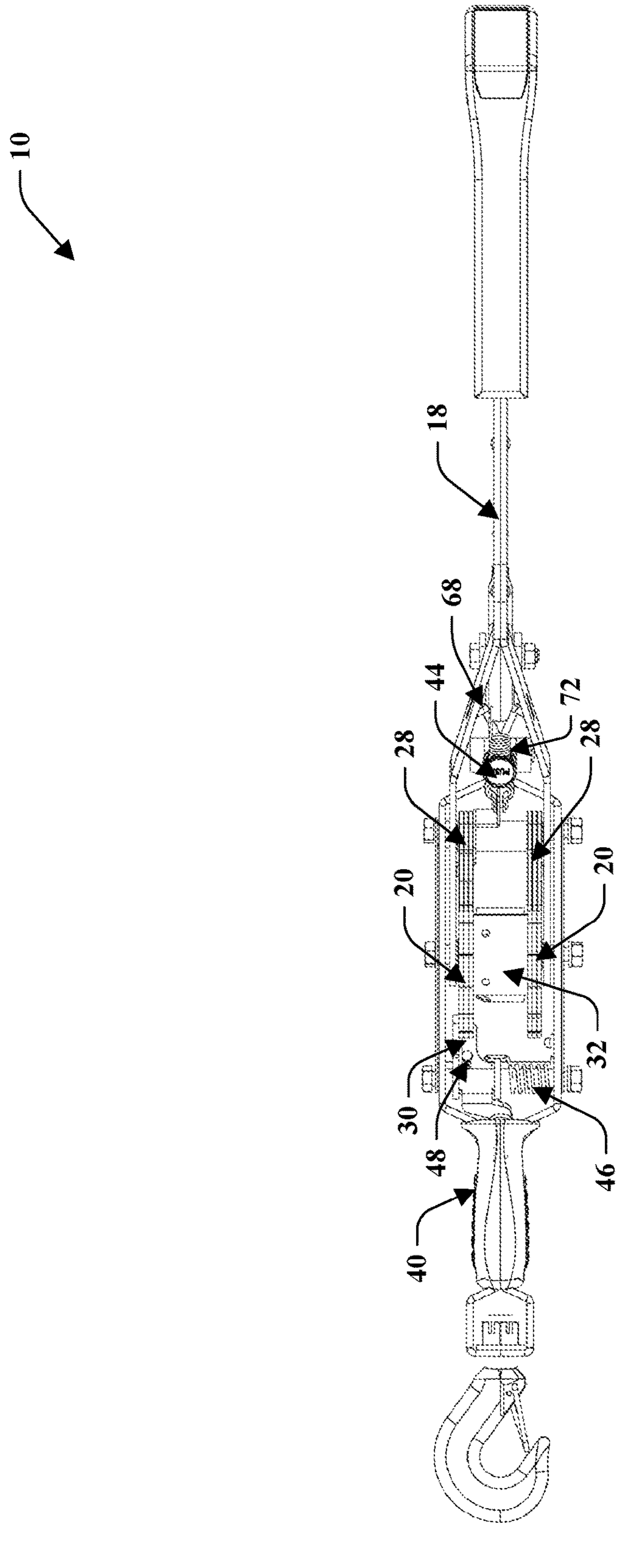
FIG. 6 is a top view of the come along device.
Figure 7:
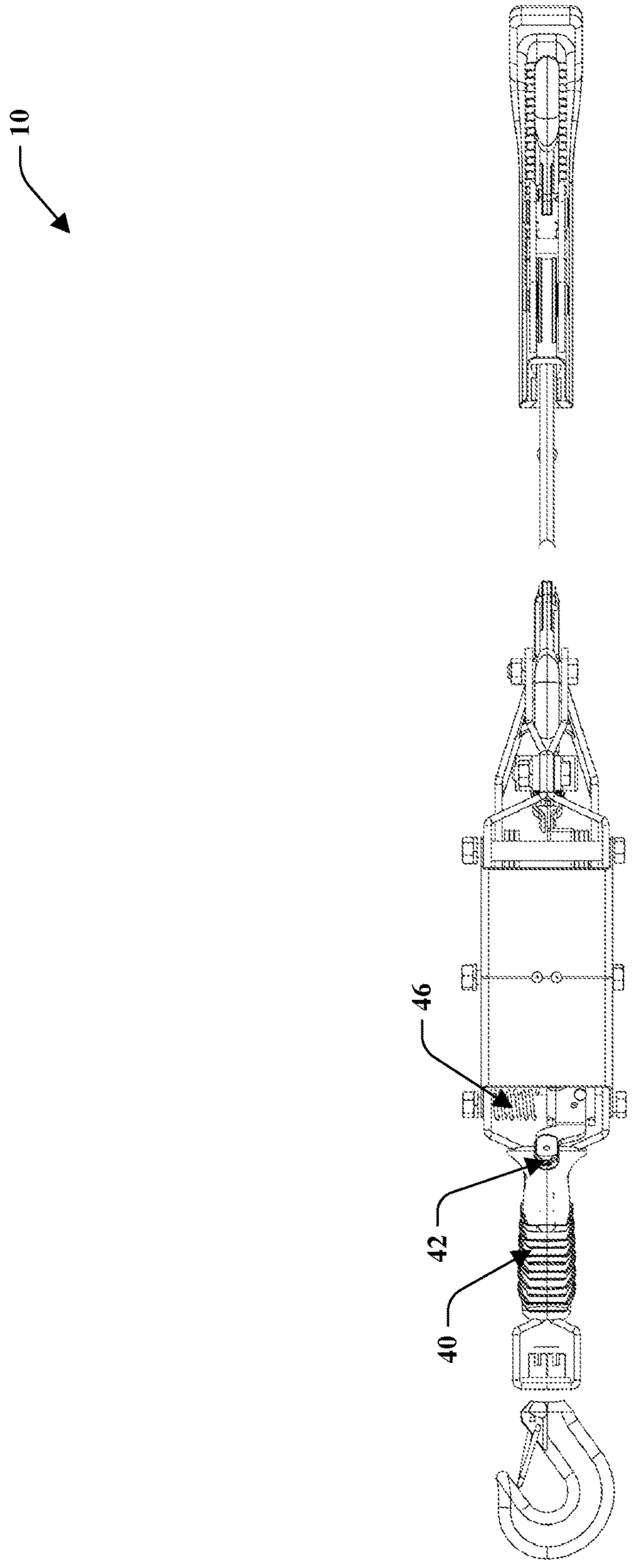
FIG. 7 is a bottom view of the come along device.
Figure 8:
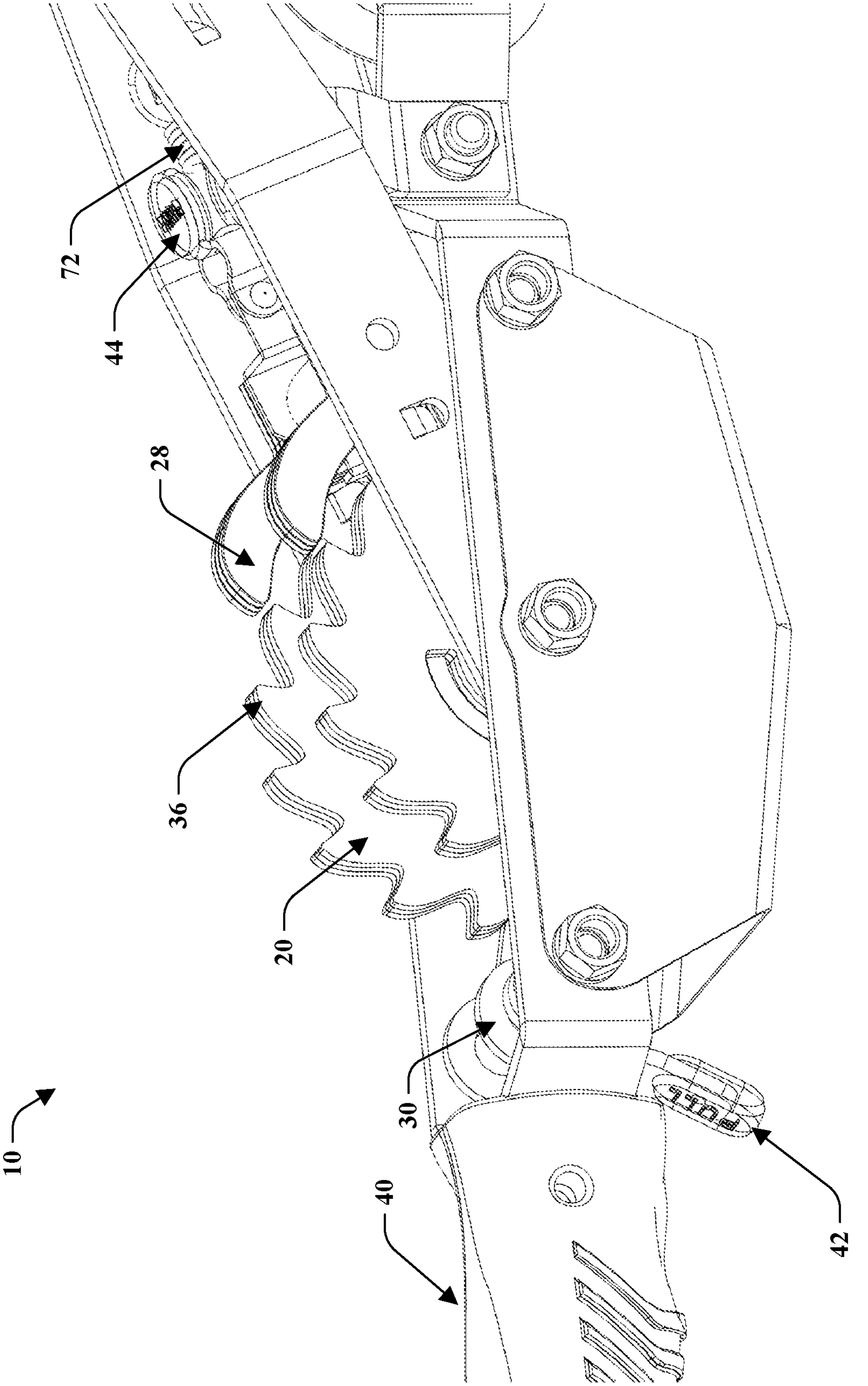
FIG. 8 is a close up perspective view of an exemplary come along device.

Come along devices can be used to pull a moveable object from a first location to a second location using a tensioned cable. To accomplish this, the come along device is affixed to a stationary object and tension may be applied to the cable to pull the moveable object toward the stationary object. Tension can be released when the operation is complete. Often a series of pawls engage a sprocket of the come along device to increase or decrease tension of the cable. These pawls are manually operated by a user and can be dangerous due to high tension in the cables. Users may be injured while operating the come along device if a user's hand or fingers are caught in the mechanical workings of the device. For instance, it may be dangerous for a user to push or pull a release pawl or a stop pawl of a come along device because of the close proximity to the sprocket. The lack of user-friendly and safe surfaces for gripping can require a user's hand or fingers to be in close proximity to dangerous moving parts. Therefore, it may be desirable to provide a come along device with improved operating surfaces for safety and efficiency.

Turning now to FIGS. 1-8, a come along device is shown generally at reference numeral 10. The come along device 10 may include a body 12, a first end 14, a second end 16, an arm 18, a sprocket 20, a plurality of hooks 22, 24, 26, at least one release pawl 28, at least one stop pawl 30, and a hub 32 affixed to the sprocket 20. The at least one release pawl 28 may engage teeth 36 of the sprocket to wind the sprocket 20 and hub 32 in a first direction 34. The at least one stop pawl 30 may engage the teeth 36 of the sprocket 20 to limit rotation of the sprocket and hub 32 to only the first direction 34. Together, the release pawl 28 and the stop pawl 30 may be used to increase or decrease the tension of the cable as desired.

To operate the come along device 10, an operator may attach the first end 14 to a stationary object using a first cable and the hook 22. An object, such as a moveable object may be attached to the second end 16 using a second cable and the hooks 24 and 26, for example. The second cable may be wound around the hub 32, and tension may be applied to the cable by rotating the arm 18 in the first direction 34. As the arm 18 rotates in the first direction 34, the at least one release pawl 28 engages the teeth 36 to rotate the sprocket 20 and wind the second cable around the hub 32. The stop pawl 30 may engage with the sprocket 20 ensure that the hub 32 may only rotate in the first direction 34. In this manner, as the stop pawl 30 is engaged with the sprocket 20, the sprocket 20 may only be rotated in the first direction and the tension of the cable may only be increased. As the hub 32 is rotated, tension is increased, and the moveable object may be pulled towards the stationary object.

The come along device 10 may further include a handle 40. The handle 40 may be affixed to the body 12 between the body 12 and the first end 14 of the come along device 10. The handle 40 may be shaped and configured to allow an operator's hand to grip to the handle 40 during the operation of the come along device 10 and during transportation. The handle 40 may also provide an increased grip that may prevent a user's hand from slipping during operation of the come along device 10. The handle 40 may be formed of any suitable material such as, but not limited to, metal, steel, polymers, plastic, composite, rubber, or any combination of materials.

The come along device 10 also includes a release trigger 42, which may be proximate to the handle 40 of the come along device 10. The release trigger 42 may be affixed to the stop pawl 30 such that an operator may disengage or engage the stop pawl 30 with the sprocket 20 by pulling or releasing the release trigger 42, respectively. In an example, the release trigger 42 and stop pawl 30 are biased in an engaged position by a biasing member, such as a spring 46 such that the stop pawl 30 is in the engaged position unless the operator is pulling the trigger 42. While in the engaged position, the sprocket 20 is limited to rotation in only the first direction 34. In this manner, the sprocket 20 can only rotate in direction 34 to increase the tension of the cable (e.g., unless the release trigger 42 is pulled). When the trigger 42 is pulled, the sprocket 20 may be rotated in a second direction 35 to release tension in the cable.

The orientation of the handle 40 and the release trigger 42 allows the user to actuate the trigger 42 with the same hand that is gripping the handle 40. For instance, the handle 40 can include finger grip areas that can be grasped by the user's fingers and thumb such that that user's index finger is located proximate the body 12 and the user's pinky finger is located proximate the first end 14. The trigger 42 may be located between the handle 40 and the body 12 such that the user's index finger may reach the trigger 42 while the user is grasping the handle 40. The orientation of the handle 40 and trigger 42 allows the user to pull the trigger 42 while maintaining control of the come along device 10, allowing the user to maintain his or her grip on the come along device 10 while simultaneously releasing tension on the come along device 10. In this manner, the come along device 10 can provide improved safety and efficiency.

The come along device 10 additionally includes a push tab 44. The push tab 44 may be operably attached at one end to the release pawl 28 to allow a user to engage and disengage the release pawl 28 with the teeth of the sprocket 20. The push tab 44 can be attached at a second end to a surface of the arm 18. In an example, the push tab 44 can be installed between the release pawl 28 and spring 72 to allow a user to move the release pawl 28 between the engaged and the disengaged positions, and the spring 72 may be attached to the arm 18 in a suitable manner, for example via a loop of the spring 72 being secured to a tab 68 projecting inward from the arm 18. When the push tab 44 is pulled up, the release pawls 28 engages the teeth 36 of sprocket 20 to allow an operator to wind the cable around hub 32. When the push tab 44 is pushed down, the release pawls 28 disengages from the teeth 36 of sprocket 20 to allow an operator to rotate the arm 18 freely around the sprocket 20.

Figure 9:
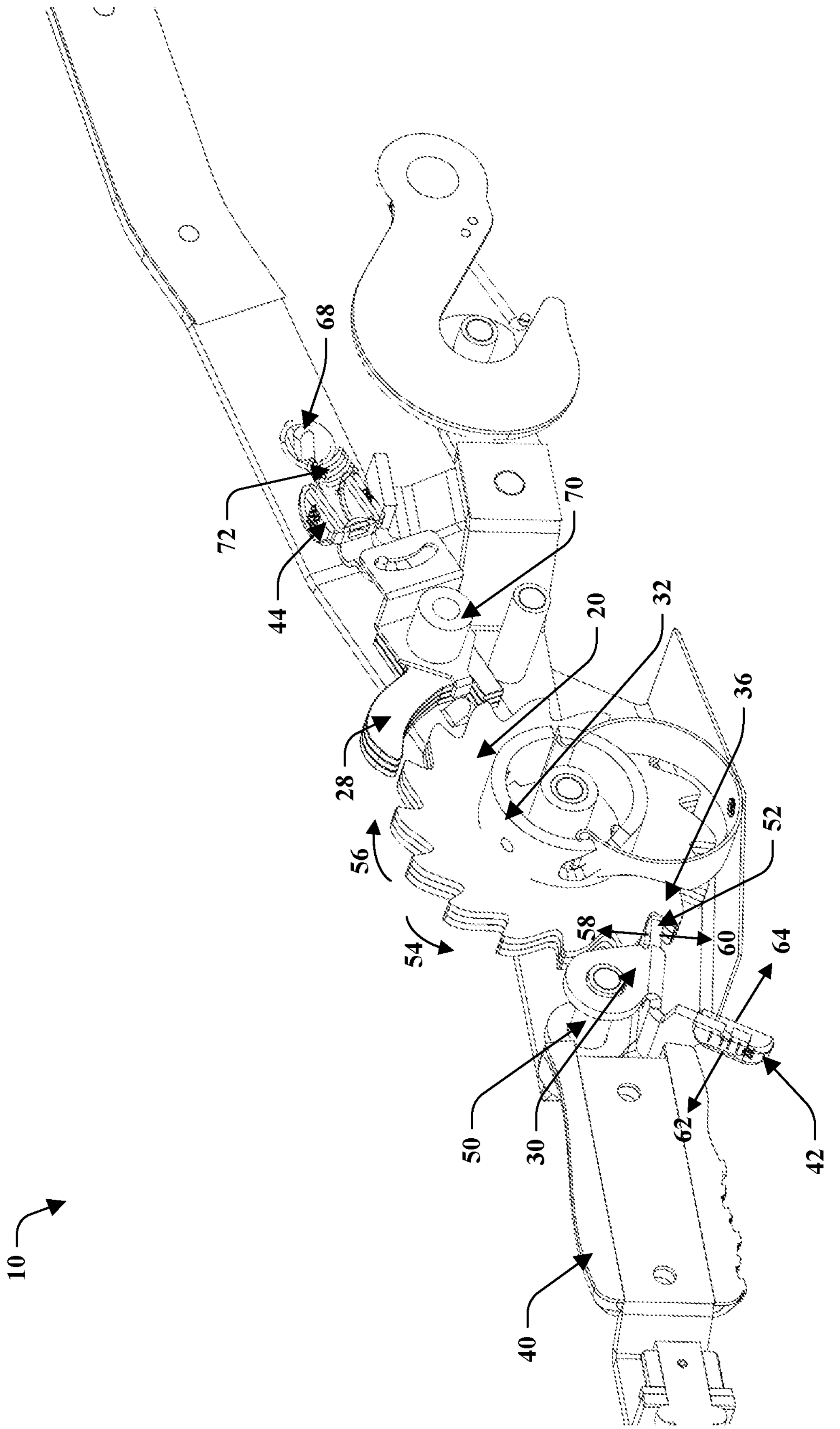
FIG. 9 is a cross-sectional perspective view of a come along device showing the stop pawl in an engaged position.

Turning to FIGS. 9-12, cross sectional views of the come along device 10 are shown for added clarity. As illustrated in FIG. 9, the stop pawl 30 may rotate around a shaft 50 and may engage the teeth 36 of the sprocket 20 at a location 52. While in the engaged position (illustrated in FIG. 9), the stop pawl 30 can prevent the sprocket 20 from rotating in a direction 56, while allowing the sprocket 20 to rotate in a direction 54. This may ensure that tension in the second cable may be increased but not decreased. The spring 46 biases the stop pawl 30 in the direction 58 to keep the stop pawl 30 in the engaged position and prevent the sprocket 20 from rotating in direction 56. The spring 46 of the stop pawl 30 allows the stop pawl 30 to move in direction 60 to allow the sprocket 20 to rotate in direction 54 (i.e., to increase tension on the second cable). In this manner, the stop pawl 30 may allow the sprocket 20 to rotate in only one direction (i.e., direction 54) while in the engaged position.

Figure 10:
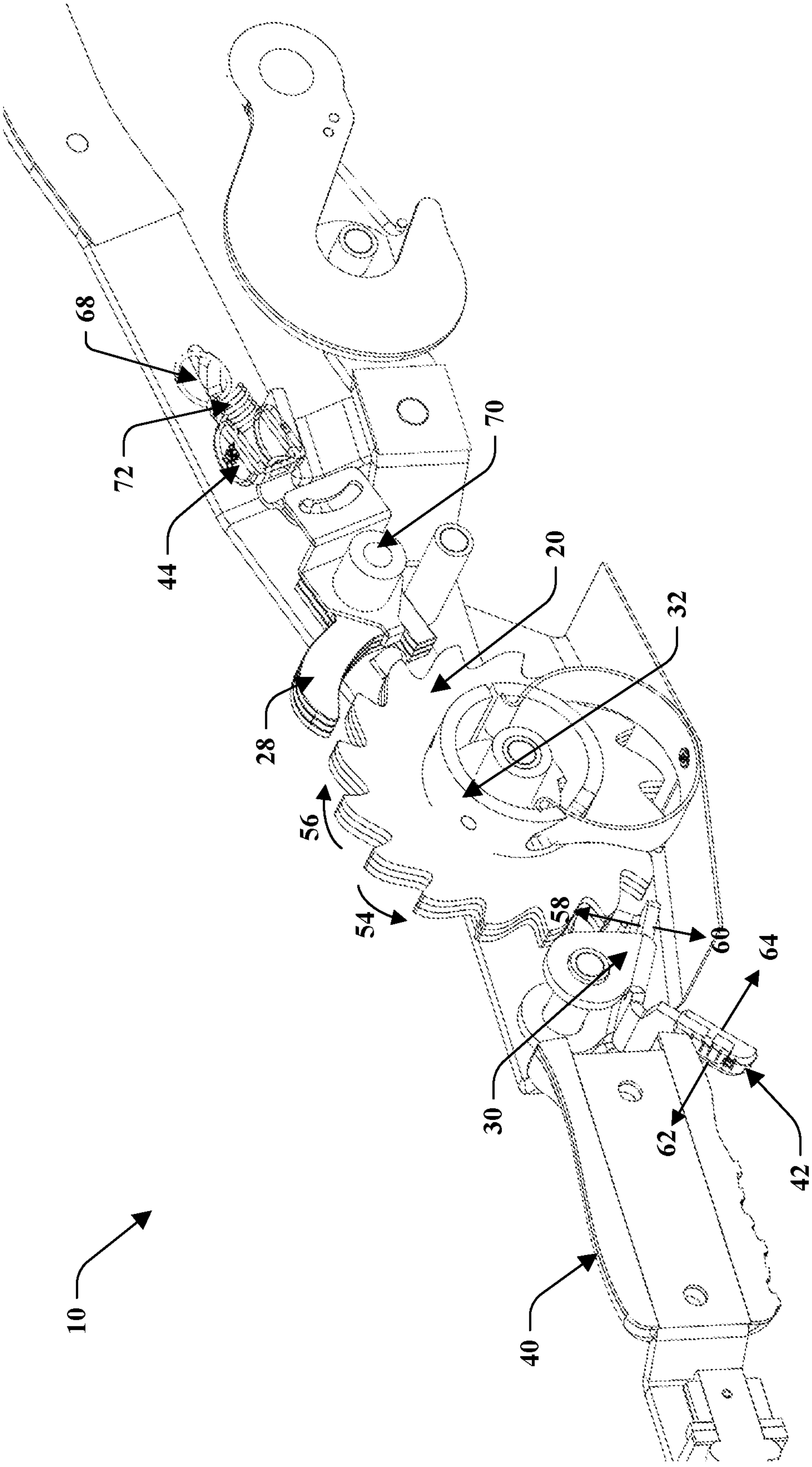
FIG. 10 is a cross-sectional perspective view of a come along device showing the stop pawl in a disengaged position.

Turning to FIG. 10, a cross sectional view of the come along device 10 is shown with the stop pawl 30 in the disengaged position. In an example, to place the stop pawl 30 in the disengaged position, the stop pawl 30 is moved in direction 60 away from the sprocket 20. In the disengaged position, the stop pawl 30 may not prevent the sprocket 20 from rotating in either direction 54 or 56 (i.e., allowing the sprocket to rotate in either direction). The disengaged position may be used to release tension in the cable, for example.

The release trigger 42 allows the operator to move the stop pawl 30 in direction 58 or 60. In an example, the operator may move the stop pawl 30 using the release trigger 42 while simultaneously gripping the come along device 10 at the handle 40. In this manner, an operator may safely move the stop pawl 30 in a direction while also maintaining control of the come along device 10. In this example, the operator may move the stop pawl 30 to the disengaged position, illustrated in FIG. 10, by pulling on the release trigger 42 in direction 62. Then, to move the stop pawl 30 to the engaged position, illustrated in FIG. 9, the operator may push the release trigger in direction 64. In an example, where a spring 46 biases the stop pawl 30 in the engaged position, the operator may simply release the trigger 42 to place the stop pawl 30 in the engaged position. In an embodiment, when under tension, the user will not be able to actuate the release trigger. To reduce tension, the user can rotate the arm 18, when the release pawl 28 is in the disengaged position, toward the release trigger 42 until the release pawl 28 contacts pin 48 (FIG. 6) and moves the pin 48 and thus the trigger 42 and stop pawl in the direction 60. This will allow the sprocket 20 to rotate in direction 56 through one tooth of the sprocket 20 to reduce tension.

Figure 11:
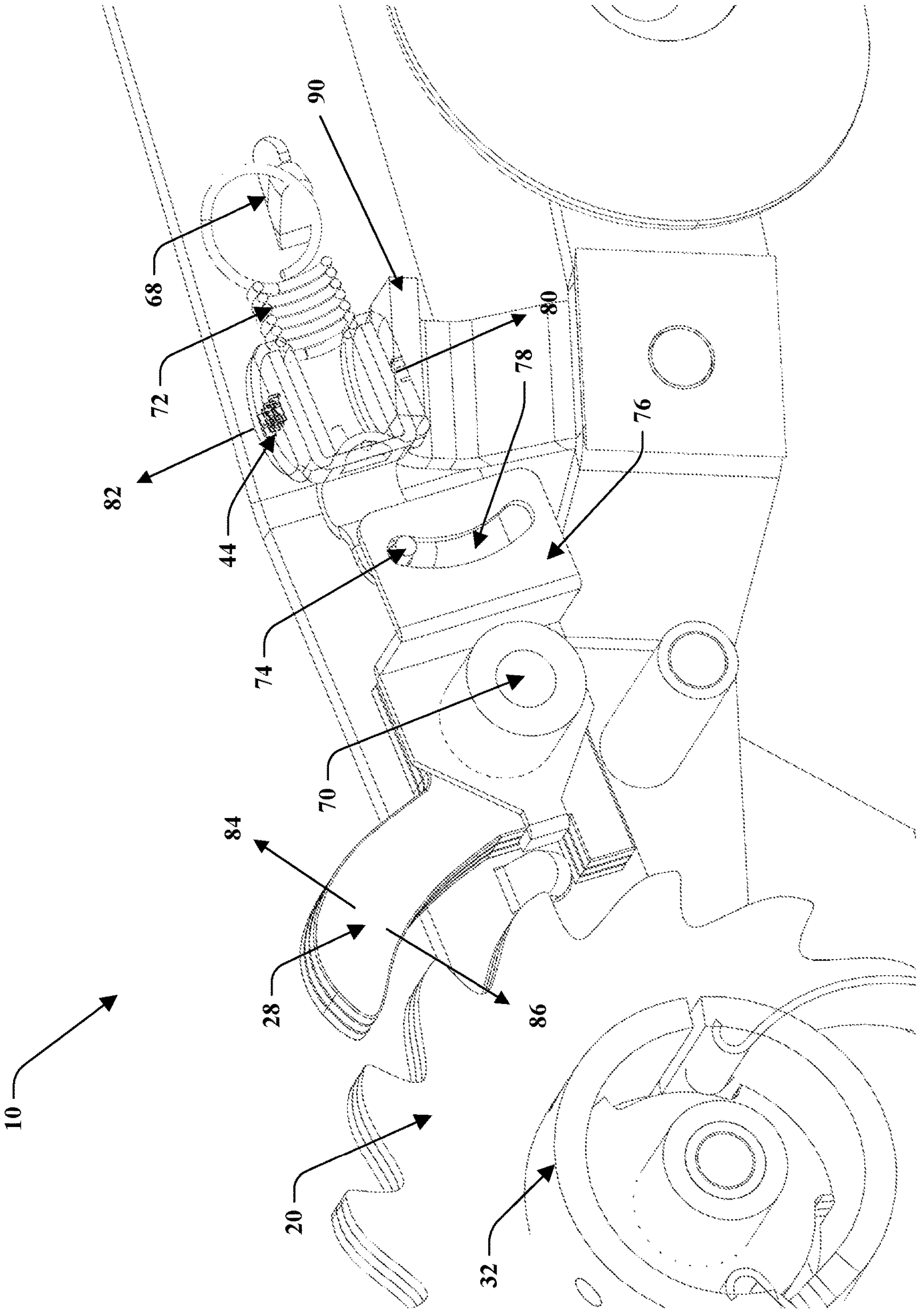
FIG. 11 is a cross-sectional perspective view of a come along device showing the release pawl in a disengaged position.

Turning to FIG. 11, a cross sectional view of an exemplary embodiment of the release pawl 28 is shown. The release pawl 28 may be rotatably affixed to the arm 18 at a shaft 70. The release pawl 28 may rotate about the shaft 70 from a disengaged position to an engaged position. When in the engaged position, the release pawl 28 may engage with sprocket 20 to allow an operator to wind the sprocket 20 and hub 32 by rotating the arm 18 in the first direction 34. When in the disengaged position, the release pawl 28 may not engage with sprocket 20 to allow an operator to rotate arm 18 freely without winding the sprocket 20. The release pawl 28 is placed into the engaged position by moving the release pawl 28 in direction 86 towards the sprocket 20, and the release pawl 28 may be placed in the disengaged position by moving the release pawl in direction 84 away from the sprocket 20.

Figure 12:
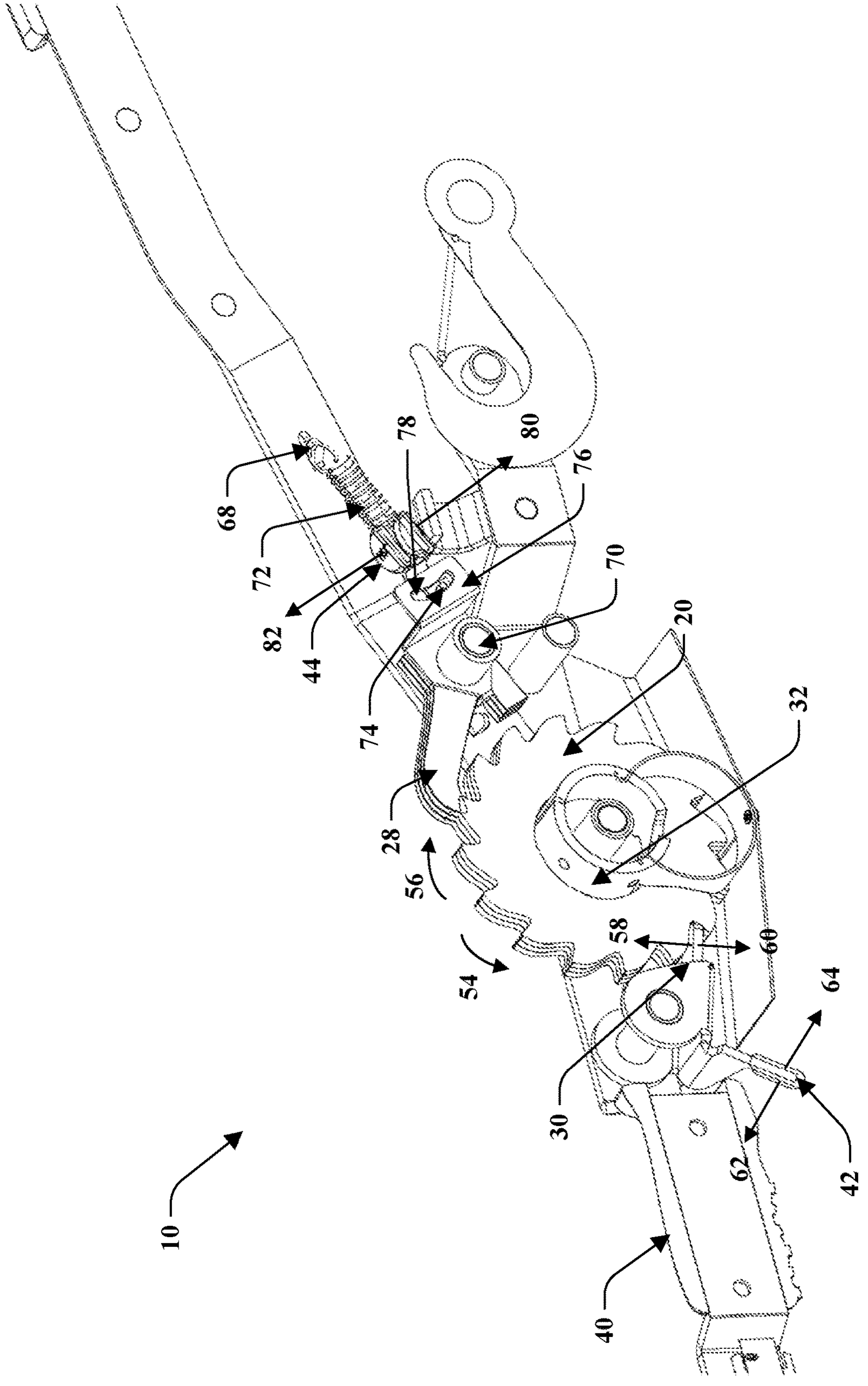
FIG. 12 is a cross-sectional perspective view of a come along device showing the release pawl in an engaged position.

The push tab 44 allows the operator to move the release pawl 28 from the disengaged position to the engaged position. For example, pushing the push tab 44 in direction 80 may rotate the release pawl 28 about shaft 70 forcing the release pawl 28 in direction 86, thereby engaging the release pawl 28 with the sprocket 20 as shown in FIG. 12. To place the release pawl 28 in the disengaged position, for example when done tightening the come along device 10, the push tab 44 may be pulled in the direction 82 to rotate the release pawl 28 about shaft 70 in direction 84 and into the disengaged position. A user may pull the push tab 44 upward in direction 82, or alternatively, the user may rotate the arm 18 in the second direction until the push tab 44 contacts a release 90 and the release 90 moves the push tab 44 upward in direction 82. In other words, the release pawl 28 is placed into the disengaged position when the arm 18 is rotated fully in the second direction 35 such that the push tab 44 engages with the release 90.

The release pawl 28 may include a base 76 with a curved slot 78 to accept a pin 74. The pin 74 may be affixed to the push tab 44 and may operably engage with the base 76 to rotate the release pawl 28 about the shaft 70. The push tab 44 may be attached to a spring 72 that holds the release pawl 28 in one of two positions (i.e., engaged or disengaged). When the pin 74 is at a top of the slot shown in FIG. 11, the release pawl 28 is disengaged, and when at a bottom of the slot shown in FIG. 12, the release pawl 28 is engaged. The curved shape of the slot 78 along with the tension of spring 72 act to bias the release pawl 28 in either the engaged or the disengaged positions.

The release trigger 42 and the push tab 44 may include markings to indicate functionality. For example, the marking on the release trigger 42 may state "pull" to indicate to an operator that the trigger 42 may be pulled. Similarly, the marking on the push tab 44 may state "push" to indicate to an operator that the push tab 44 may be pushed.

In another example, the handle 40, the release trigger 42, and the push tab 44 may be a color. The color may be a different color than the overall appearance of the come along device 10 to allow an operator to easily identify the handle 40, the release trigger 42 and push tab 44. In an example, the color of the handle 40, the release trigger 42 and the push tab 44 may be green to allow the respective elements to stand out against the color of the come along device 10. In another example, the color of the handle 40, the release trigger 42, and the push tab 44 may be different colors to differentiate between the respective elements. It should be appreciated that the color and appearance of the release trigger 42, and the push tab 44 may be modified as needed to achieve the desired appearance and to differentiate the elements from the rest of the come along device 10, and can be adjusted to indicate different weight requirements of the come along.

Although certain embodiments have been shown and described, it is understood that equivalents and modifications falling within the scope of the appended claims will occur to others who are skilled in the art upon the reading and understanding of this specification.

What is claimed is:

1. A come along device comprising:
- a body;
- an arm movable relative to the body;
- a sprocket rotatably attached to the body and configured to accept a cable;
- a release pawl configured to rotate between an engaged position and a disengaged position, wherein the release pawl engages the sprocket when the release pawl is in the engaged position such that when the arm is rotated in a second direction the sprocket is also rotated in the second direction to apply a tension in the cable;
- a biasing member configured to hold the release pawl in either of the engaged position or the disengaged position; and
- a push tab configured to move the release pawl between the engaged position and the disengaged position, wherein the push tab is coupled to the biasing member between a first end of the biasing member and a second end of the biasing member.

2. The come along device of claim 1, further comprising a stop pawl configured to rotate between an engaged position and a disengaged position, wherein the stop pawl engages the sprocket when the stop pawl is in the engaged position to prevent rotation of the sprocket in a first direction and to allow rotation of the sprocket in a second direction.

3. The come along device of claim 2, further comprising a release trigger extending from the stop pawl to move the stop pawl between the engaged position and the disengaged position such that the sprocket may be rotated in the first direction when in the disengaged position to release the tension in the cable.

4. The come along device of claim 3, further comprising a handle shaped for a user to grip, the handle affixed to the body proximate the release trigger, the handle extending towards a hook located opposite the release trigger.

5. The come along according to claim 4, wherein the user's hand is configured to grip the handle and the release trigger is configured to be engaged by the user's index finger.

6. The come along device of claim 2, wherein the stop pawl is biased in the engaged position by a biasing member.

7. The come along device of claim 1, wherein the push tab is configured to move the release pawl into the engaged position when pushed in a first direction.

8. The come along device of claim 7, wherein the push tab is configured to move the release pawl into the disengaged position when pulled in a second direction opposite the first direction.

9. The come along device of claim 1, further comprising a release surface configured to bias the push tab in a direction when the arm is rotated fully in the first direction such that the release pawl is placed into the disengaged position.

10. A come along device comprising:
- a body;
- a sprocket rotatably attached to the body and configured to accept a cable;
- a stop pawl configured to prevent rotation of the sprocket in a first direction and to allow rotation of the sprocket in a second direction;
- a release trigger extending from the stop pawl configured to move the stop pawl between an engaged position and a disengaged position such that the sprocket may rotated in the first direction to release a tension in the cable; and
- a handle for a user to grip, the handle affixed to the body at a first end and extending in a direction from the body to the release trigger,
- wherein the handle comprises an outer contour shaped to correspond to a shape of hand such that the user's hand wraps around the outer contour of the handle to grip the handle, the handle further configured to allow the user's index finger to engage the release trigger while gripping the handle.

11. The come along device of claim 10, further comprising a release pawl configured to rotate between an engaged position and a disengaged position, wherein the release pawl engages the sprocket when the release pawl is in the engaged position such that when an arm of the come along device is rotated in the second direction the sprocket is also rotated in the second direction to apply a tension in the cable.

12. The come along device of claim 11, further comprising a push tab configured to move the release pawl between the engaged position and the disengaged position.

13. The come along device of claim 12, further comprising the arm moveably attached to the body, wherein the push tab is coupled between a first end of a biasing member and a second end of the biasing member to move the release pawl between the engaged position and the disengaged, the first end of the biasing member affixed to the release pawl and the second end of the biasing member affixed to the arm.

14. The come along device of claim 12, wherein the push tab is configured to move the release pawl into the engaged position when pushed in a first direction.

15. The come along device of claim 14, wherein the push tab is configured to move the release pawl into the disengaged position when pulled in a second direction opposite the first direction.

16. The come along device of claim 12, further comprising the arm rotatably attached to the body and a release surface configured to bias the push tab in a direction when the arm is rotated fully in the first direction such that the release pawl is placed into the disengaged position.

17. The come along device of claim 12, wherein the push tab is coupled in line with a biasing member, the biasing member configured to bias the release pawl in either of the engaged position or the disengaged position.

18. The come along device of claim 10, wherein the stop pawl is biased in the engaged position by a spring.

19. The come along device according to claim 10, further comprising a hook extending from an end of the handle opposite the body.

20. A come along device comprising:

a body;

an arm movable relative to the body;

a sprocket rotatably attached to the body and configured to accept a cable;

a release pawl configured to rotate between an engaged position and a disengaged position, wherein the release pawl engages the sprocket when the release pawl is in the engaged position such that when the arm is rotated in a second direction the sprocket is also rotated in the second direction to apply a tension in the cable;

a push tab configured to move the release pawl between the engaged position and the disengaged position, wherein the push tab is coupled between a first end of a biasing member and a second end of the biasing member, the first end of the biasing member coupled to the release pawl and the second end of the biasing member coupled to the arm; and a handle for a user to grip, the handle affixed to the body at a first end and extending in a direction from the body to a release trigger, wherein the handle comprises an outer contour shaped to correspond to a shape of hand such that the user's hand wraps around the outer contour of the handle to grip the handle the handle further configured to allow the user's index finger to engage the release trigger while gripping the handle.

* * * * *